(12) United States Patent
Gwon (10) Patent No.: US 12,319,495 B2
(45) Date of Patent: Jun. 3, 2025

(54) METHOD OF REQUESTING WASTE COLLECTION SERVICES

(71) Applicant: Ecube Labs Co., LTD., Monterey Park, CA (US)

(72) Inventor: Sunbeom Gwon, Seoul (KR)

(73) Assignee: Ecube Labs Co., LTD., Monterey Park, CA (US)

( * ) Notice: Subject to any disclaimer, the term of this patent is extended or adjusted under 35 U.S.C. 154(b) by 40 days.

(21) Appl. No.: 17/755,015

(22) PCT Filed: Oct. 21, 2020

(86) PCT No.: PCT/US2020/056553
§ 371 (c)(1),
(2) Date: Apr. 19, 2022

(87) PCT Pub. No.: WO2021/081019
PCT Pub. Date: Apr. 29, 2021

(65) Prior Publication Data
US 2022/0396424 A1     Dec. 15, 2022

Related U.S. Application Data (60) Provisional application No. 62/923,795, filed on Oct. 21, 2019.

(51) Int. Cl.
*B65F 1/14*     (2006.01)
*H04L 67/12*    (2022.01)

(52) U.S. Cl.
CPC ............... *B65F 1/14* (2013.01); *H04L 67/12* (2013.01); *B65F 2210/128* (2013.01);
(Continued)

(58) Field of Classification Search
CPC .............. B65F 1/14; B65F 2210/128; B65F 2210/138; B65F 2210/1443;
(Continued)

(56) References Cited

U.S. PATENT DOCUMENTS 10,332,197 B2 *   6/2019   Kekalainen ............ G06Q 10/08
2004/0199545 A1 * 10/2004  Wagner ................. B65F 1/1638
(Continued)

FOREIGN PATENT DOCUMENTS

WO     2018/215683     11/2018
WO     2019/040946     2/2019

OTHER PUBLICATIONS

International Search Report issued in PCT/US20/56553, mailed Jan. 19, 2021.
(Continued)

*Primary Examiner* — Rufus C Point
(74) *Attorney, Agent, or Firm* — ICE MILLER LLP (57) ABSTRACT

A method for efficiently and automatically requesting waste collection services through the use of mobile communication devices is disclosed. The method utilizes a fill-level sensor or fill-level sensors attached to dumpsters of various sizes. The fill-level sensor is configured to monitor a dumpster's capacity in terms of waste volume. Whenever the volume reaches a predetermined fill-level set by the generator, an automatic collection request is sent out to at least one hauler capable of carrying out the collection.

19 Claims, 6 Drawing Sheets

(52) U.S. Cl.
CPC . *B65F 2210/138* (2013.01); *B65F 2210/1443* (2013.01); *B65F 2210/168* (2013.01)

(58) Field of Classification Search
CPC ...... B65F 2210/168; B65F 1/00; H04L 67/12; Y02W 90/00; G06Q 10/30; H04W 4/38
See application file for complete search history.

(56) References Cited

U.S. PATENT DOCUMENTS

| | | |
|---|---|---|
| 2007/0080223 A1 | 4/2007 | Japuntich |
| 2012/0191558 A1 | 7/2012 | Kilimnick |
| 2015/0294431 A1* | 10/2015 | Fiorucci ............... G07B 15/02 705/13 |
| 2015/0307273 A1* | 10/2015 | Lyman ............... B65F 1/1615 705/26.61 |
| 2016/0300297 A1* | 10/2016 | Kekalainen ........... G06F 17/18 |
| 2017/0109704 A1 | 4/2017 | Lettieri et al. |
| 2017/0118609 A1 | 4/2017 | Rodoni |
| 2017/0211969 A1* | 7/2017 | Waite .................. B30B 9/3046 |
| 2018/0158033 A1 | 6/2018 | Woods et al. |
| 2019/0311333 A1* | 10/2019 | Kekalainen ........... H04W 4/38 |
| 2020/0189844 A1 | 6/2020 | Sridhar |
| 2020/0191580 A1* | 6/2020 | Christensen ......... G01C 21/343 |

OTHER PUBLICATIONS

Extended European Search Report issued in EP 20 87 9341, dated Oct. 12, 2023.

\* cited by examiner

METHOD OF REQUESTING WASTE COLLECTION SERVICES

CROSS-REFERENCE TO RELATED PATENT APPLICATIONS

This is a U.S. National Phase Application under 35 U.S.C. § 371 of International Patent Application No. PCT/US2020/056553, filed Oct. 21, 2020, and claims priority to U.S. Provisional Patent Application No. 62/923,795, filed Oct. 21, 2019, which is incorporated by reference in its entirety. The International Application was published on Apr. 29, 2021, as International Publication No. WO 2021/081019 A1.

BACKGROUND OF THE PRESENT DISCLOSURE

Embodiments of the present disclosure relate to waste management, and more specifically, to a system for optimized waste collection.

Current waste collection practices are not as efficient as they could be. The inefficiency mainly stems from the fact that collection schedules are set to a time interval, rather than to the dumpster's capacity. For example, an entity that is contracted for one collection per week will receive the collection service even if the dumpster is not even close to its maximum capacity. From the waste generator's point of view, such practice is inefficient and costly because a lot of collections are being made even though it is unnecessary. Likewise, current waste collection practices also impose needless resource drain on waste haulers. For example, a hauler that is obligated to collect waste from one hundred dumpsters in a day must attend to all one hundred of them even if only fifty of the dumpsters are in actual need of collection. As a result, this incurs unnecessary labor costs and increases the transportation cost of waste hauling trucks.

In addition to the increase in operational costs, there is another added cost that is hard to calculate but no less important: environmental cost. Both generators and haulers lack environmental accountability under the current waste collection practice. Because generators pay a set price for a fixed number of collection services, the generators do not know, nor are they incentivized to be concerned with, how much waste is being generated. There is no incentive for the generator to minimize waste generation because the cost remains the same regardless of the amount of waste. For haulers who receive guaranteed revenue, there is no incentive to reduce or minimize environmental costs originating from excess $CO_2$ emissions. Moreover, inefficient operation on a haulers' part means a lot of needless consumption and more extraction of fossil fuel which puts extra strain on the environment.

Another shortcoming of current practices is that the communication between generators and haulers is not performed in real-time nor through direct communication channels. If there are special circumstances a generator wants a hauler to know about, the generator must contact the hauling company, usually its back office, and the back office relays the information to the individual drivers. The process is cumbersome and slow. By introducing mobile devices to the process, an open and real-time communication channel is open between generators and haulers.

BRIEF SUMMARY

According to embodiments of the present disclosure, methods of, systems, and computer program products for waste management are provided. A method of requesting a waste collection service via a mobile communication network using a fill-level sensor operatively coupled to a waste receptacle, the method includes: transmitting data generated by the fill-level sensor to a remote computer system via the mobile communication network, the data comprising a fill-level of the waste receptacle. The method may include analyzing the fill-level sensor data to determine if the fill-level is at a predetermined fill-level. If the remote computer system determines that the fill-level of the waste receptacle is equal to or greater than the predetermined fill-level, a request for waste collection service may be transmitted, by the remote computer system, to at least one waste collection service provider via a wireless communication device in the possession of the at least one waste collection service provider using the wireless communication network.

In response to input to the wireless communication device by one of the at least one waste collection service provider, a confirmation signal to the remote computer system via the wireless communication network may be transmitted from the wireless communication device. After receiving the confirmation signal at the remote computer system, a first acknowledgement signal may be sent to the one of the at least one waste collection service provider confirming that the one of the at least one waste collection service provider is tasked with emptying the waste receptacle. The remote computer system may then transmit via the wireless communications network. The mobile communication device may be located at a location of the at least one waste collection service provider. When the fill-level of the waste receptacle is equal to or greater than the predetermined fill-level, the request for waste collection service may be automatically transmitted to the at least one waste collection service provider.

In an embodiment of the present disclosure, the method may further include the step of: after receiving the confirmation signal at the remote computer system, transmitting, by the remote computer system via the wireless communications network, a second acknowledgement signal may then be sent to a waste site generator associated with the waste receptacle confirming that the one of the at least one waste collection service provider is tasked with emptying the waste receptacle. The second acknowledgement signal may include information selected from the group consisting of: identification of the one of the at least one waste collection service provider, a scheduled time window for emptying the waste receptacle, and a service fee expected for emptying the waste receptacle. The fill-level sensor may be selected from the group consisting of: an ultrasonic sensor, a laser sensor, a ToF (time of flight) sensor, a camera sensor, a weight sensor and an optical sensor. The data further may include at least one of: an identity of the fill-level sensor, type of waste within the waste receptacle, weight of the waste within the waste receptacle, volume of the waste within the waste receptacle, location of the waste receptacle, size of the waste receptacle, temperature data and battery usage data. The at least one waste collection service provider to whom the remote computer system transmits the request for waste collection service may be determined by the remote computer system by determining which of the waste collection service providers is capable of emptying the waste receptacle based on the information stored in the remote computer system.

The information may include at least one of: a waste collection service provider's serviceable area, a waste collection service provider serviceable waste receptacle size, a waste collection service provider serviceable waste receptacle type, and a waste collection service provider serviceable waste type. The wireless communication device may include at least one of a cellular phone, a computer, and a tablet. If multiple ones of the at least one waste collection service provider transmit a confirmation signal to the remote computer system, then the remote computer system may transmit the first acknowledgement signal to the one of the at least one waste collection service provider whose confirmation signal was received by the remote computer system first. If multiple ones of the at least one waste collection service provider transmit a confirmation signal to the remote computer system, then the remote computer system may transmit the first acknowledgement signal to the one of the at least one waste collection service provider whose service fee stored by the remote computer system is the lowest. The data may further include a waste type, wherein the waste type may be selected from: organic waste, industrial waste, medical waste, at least a perishable waste, recyclable waste, and the like.

The remote computer system prioritizes sending the request for waste collection service to empty the waste receptacle containing the perishable waste. The fill-level sensor periodically transmits the data to the remote computer system and the remote computer system periodically determines whether the fill-level of the waste receptacle is equal to or greater than the predetermined fill-level. The remote computer system transmits additional information about the request for waste removal service further includes at least one of: a location of the waste receptacle, a time window for emptying the waste receptacle, and a special request from a waste generator site associated with the waste receptacle.

DETAILED DESCRIPTION OF THE PRESENT DISCLOSURE

Waste disposal and collection is an important part of waste management. Embodiments of the present disclosure provide for efficient collection of waste at waste generator sites by using a user-facing service connected to a backend management system.

The present disclosure describes a method for efficiently and automatically requesting waste collection services through mobile communication network. The method restricts the time of collection to only when the waste receptacle (e.g., a dumpster) reaches a certain fill-level, which is set by the generator. A collection request is then automatically sent out to at least one hauler who can complete the request. As a result, the waste collection frequency is decreased, saving significant costs to both the generator and the hauler.

Although the exemplary embodiments disclosed herein depict the novel system and methods with the application of a fill level sensor, it will be understood by artisans within the field that the present disclosure could monitor waste volume and/or waste weight within a given waste receptacle. Additionally, or alternatively, the systems and methods of the present disclosure can also detect the contents of the waste. For example, perishable food that begins to decay/rot might emit unpleasant odors, so those waste containers can be prioritized within the request queue over other (e.g. non-perishable) waste containers. Also, in some embodiments, the sensor(s) detect if the waste includes recyclable materials.

The fill-level sensor(s) employed in the systems disclosed herein periodically and automatically transmits fill-level data of a dumpster to a computer system through a mobile communication network. Additional data sent along with the fill-level data include, but are not limited to, collection data, location data, temperature data and battery usage data. The fill-level data of different dumpsters can be stored in the computer system and are matched to each sensor. The time gap between each transmission can be flexible but its default value is set at, e.g., 1 minute. The computer system, then, examines through all imported data sorted by service account identifier and matches this data with all fill-level sensor data, which is uniquely identified by the sensor's serial number. Once the computer system determines that the actual fill-level is equal to or higher than the predetermined fill-level, an automatic collection request is triggered and sent out to at least one hauler. After the hauler confirms the intention to carry out the collection, it's relayed back to the computer system. At that point, the computer system sends out acknowledgement of the acceptance to the hauler and confirmation of the scheduled collection to the generator. The process is finished once the collection is complete.

Figure 1:
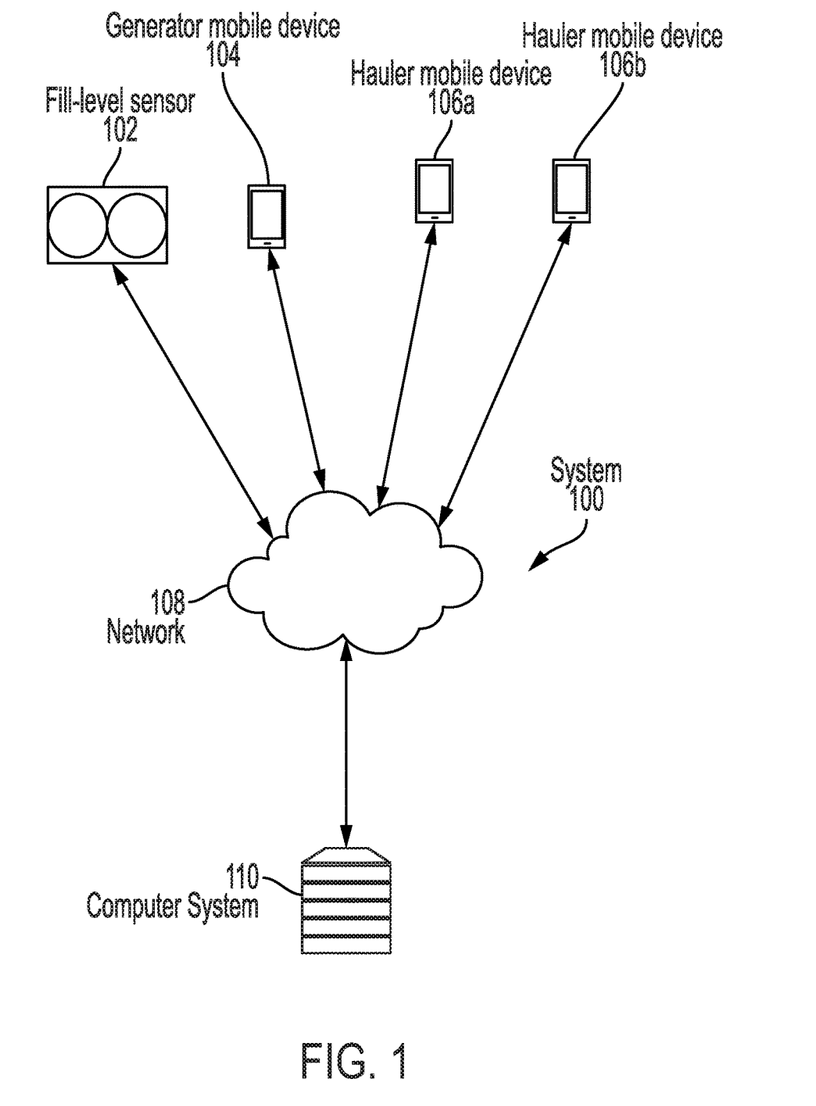
FIG. 1 depicts an example of a schematic graphical representation of a system for implementing the presently disclosed embodiments.

FIG. 1 is an example of a system, 100, showing how different components of the invention work in making an efficient and automatic request for waste collection services. Fill-level sensor, 102, may be, but is not limited to, an ultrasonic sensor, a laser sensor, a ToF (time of flight) sensor, a camera sensor, or a weight sensor or an optical sensor. Through network, 108, fill-level sensors 102 periodically send fill-level data of dumpsters they are monitoring to computer system, 110, and the data gets stored in the system 110. In turn, the computer system 110 periodically examines the transmitted fill-level data and determines whether the fill-level of any dumpster is equal to or higher than a predetermined fill-level the waste generator has previously set.

Once the computer system 110 identifies a dumpster that has passed the predetermined level, it sends out an automatic collection request to haulers' mobile devices, 106*a* and 106*b*. Every automatic collection request is paired with a service account identifier along with additional information such as collection date, fill-level at the time of automatic collection request, and any special request the generator may have.

Each hauler mobile device, 106*a* and 106*b*, may be a wireless mobile hardware device with software capable of communicating data to and from other mobile devices, a computer device, or servers through network 108, and capable of determining its geographic location. Once the hauler mobile device receives the automatic collection request from the computer system 110, the hauler can send acceptances of the collection request back to the computer system through network 108. Lastly, the computer system 110 sends acknowledgement of the acceptance back to the hauler and confirmation of the acceptance to the generator (for example, to the generator's mobile device 104 in an embodiment). It should be noted that both the generator mobile device 104 and the hauler mobile device 106a, 106b may display collection requests in a text format or a map format.

Generator mobile device 104 may be a wireless mobile hardware device with software capable of communicating information to and from other mobile devices, a computer device, or servers through network 108. Mobile devices may include, but are not limited to, cellular phones and tablets capable of connecting to a public and private network through network 108 and have geofence capabilities.

Network 108 may be a communication network configured to effectively transfer data between computers, mobile devices, and servers. The network 108 may be a private network or a public one like the Internet. Computer system 110 may receive and store fill-level data of any dumpster with a fill-level sensor 102 attached to it, analyze the received data, receive and store locations and activities of all waste collection vehicles, and be capable of communicating with other devices in the system 100. Computer system 110 may be capable of directing information to both a generator mobile device 104 and a hauler mobile device 106a, 106b. It may also be capable of sending a waste collection request automatically, receiving acceptance of a collection request from a hauler mobile device 106a, 106b, and sending an acknowledgement of acceptance back to the hauler mobile device 106a, 106b, as well as sending confirmation of the hauler's acceptance to the generator mobile device 104.

In operation, fill-level sensor 102 may periodically send fill-level data of a dumpster and its location to computer system 110 through network 108. The computer system 110 periodically monitors the fill-level of dumpsters stored in computer system 110 and checks whether a fill-level has reached a predetermined fill-level, set by the generator, at which point an automatic waste collection request is sent out to hauler mobile devices 106a and 106b. From the hauler mobile device 106a, 106b, haulers may decide whether to accept or reject the collection request and send the acceptance or rejection back to the computer system 110 through network 108. Once the computer system 110 receives a confirmation from a hauler mobile device 106a, 106b, it returns acknowledgement of the acceptance back to the selected hauler. At the same time, the computer system 110 sends confirmation of the hauler's acceptance to the generator mobile device 104.

Figure 2:
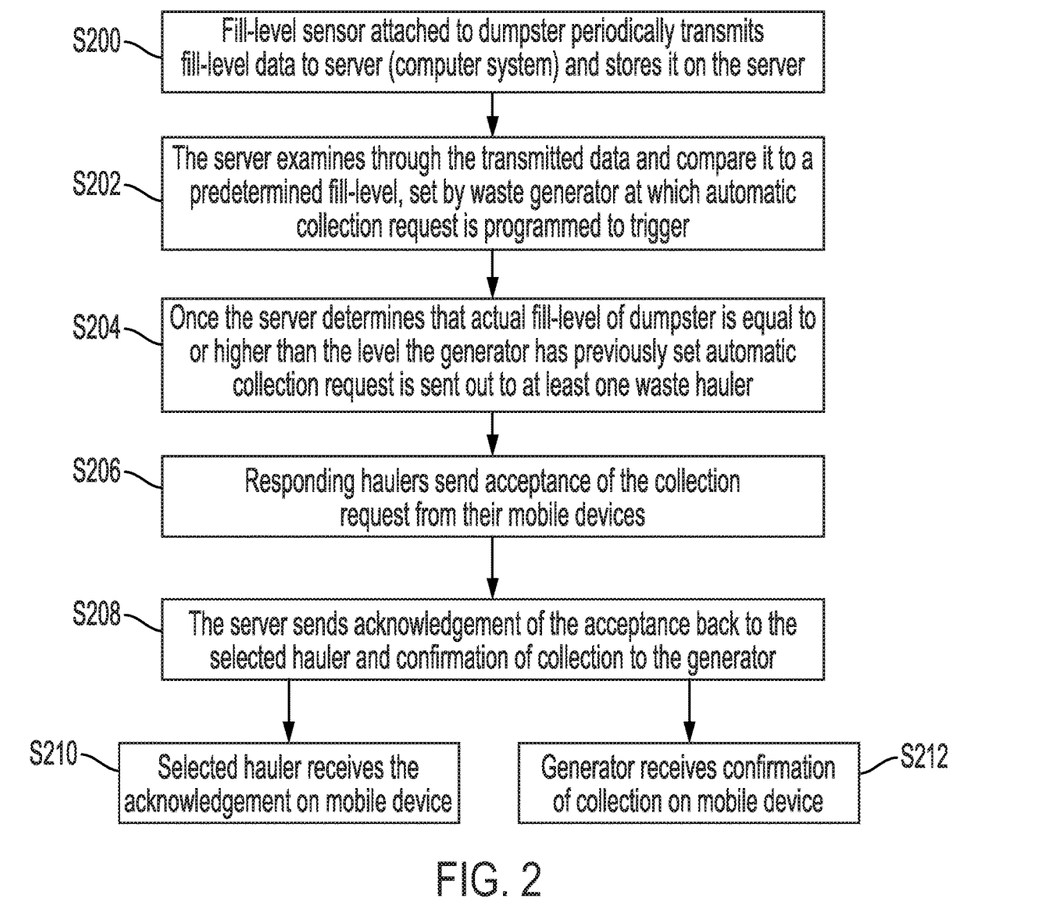
FIG. 2 depicts an example of a schematic flow diagram of a waste collection service request in accordance with the principles of the present disclosure.

FIG. 2 is a flow chart of how an exemplary waste collection service request is sent out to haulers in an embodiment. In Step 200, Fill-level sensor 102 attached to a dumpster periodically transmits its fill-level data to computer system 110 and the data is stored in it. In Step 202, the computer system 110 examines the transmitted data and compares it to a predetermined fill-level set by the generator. The computer system 110 identifies each fill-level sensor 102 by its serial number, which is one piece of information annexed under the service account identifier. Other data annexed under the service account identifier may include, but are not limited to, dumpster location, dumpster size, and waste type. The computer system 110 also contains information on individual haulers, such as serviceable areas, serviceable dumpster type and size, and serviceable waste type. In Step 204, once computer system 110 determines that the actual fill-level of a dumpster is equal to or higher than the predetermined fill-level the generator has previously set, an automatic collection request is sent out to the mobile device 106a, 106b of at least one hauler. The destination of the automatic collection request is determined by sorting out the haulers capable of carrying out the collection based on the information stored in the computer system, such as the haulers' serviceable areas, serviceable dumpster size, dumpster type, and waste type. Any hauler who possesses matching criteria may send the acceptance of the request from the hauler's mobile device 106a, 106b through the wireless network in Step 206. Once the acceptance is received, the computer system 110 sends acknowledgement of the acceptance back to the hauler and confirmation of collection to the generator in Step 208. Lastly, the selected hauler receives acknowledgement of the acceptance on the hauler's mobile device in Step 210, and the generator receives a confirmation of the collection on the generator's mobile device in Step 212.

Figure 3:
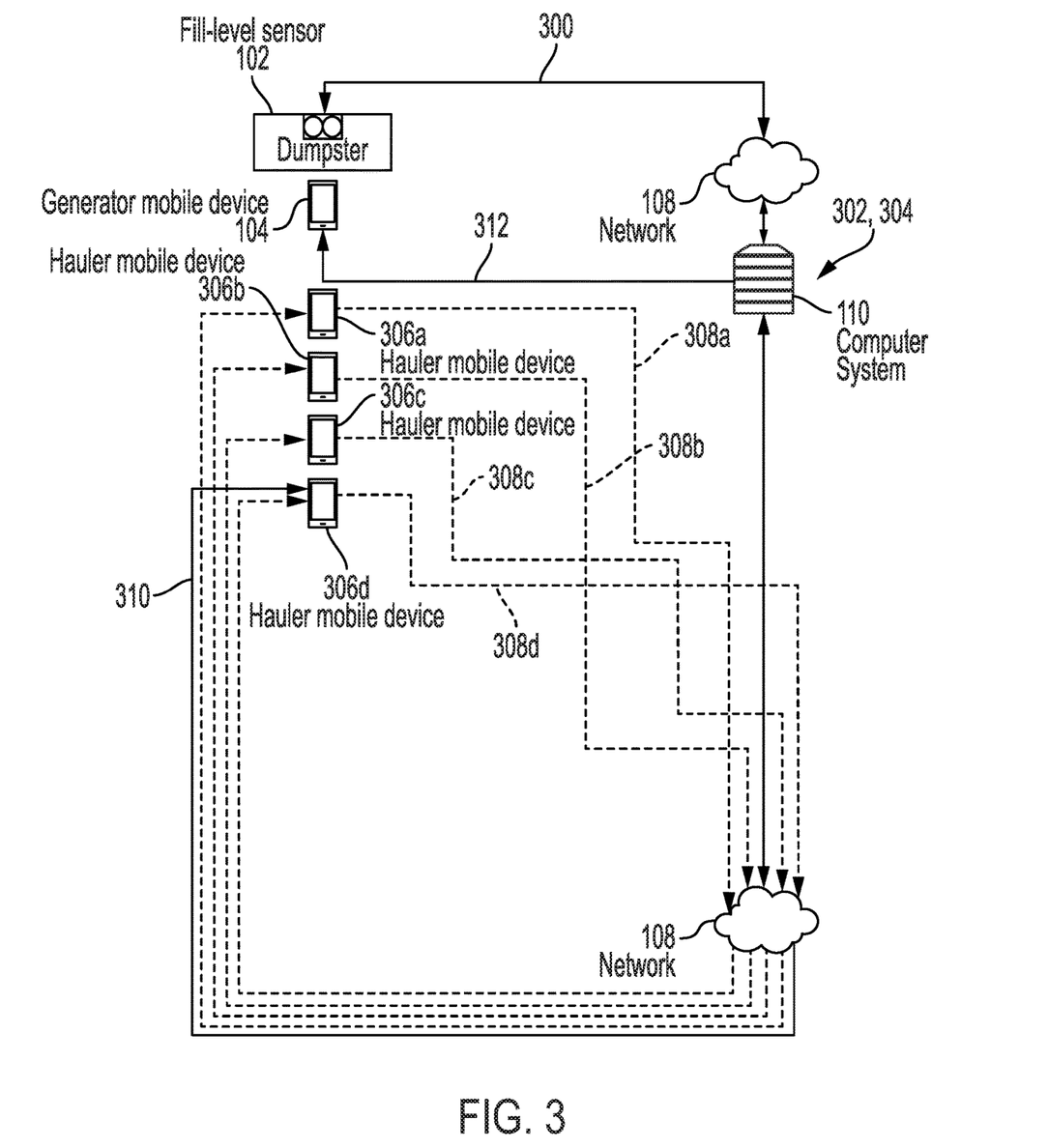
FIG. 3 depicts an example of a schematic illustration of how the present invention is applied to requesting waste collection services from a hauler in accordance with the principles of the present disclosure.

FIG. 3 is an example of a schematic illustration of how the present invention is applied to requesting waste collection services from a hauler in an embodiment. In step 300, a fill-level sensor 102 of a dumpster transmits its fill-level data to computer system 110 through network 108. At step 302, the computer system 110 examines the received data. A goal of the examination is to find the dumpsters with a fill-level that is higher than what the generator has set as a trigger point for sending automatic collection request. In step 304, the computer system 110 determines whether the dumpster's fill-level has reached the predetermined level, set by the generator. For example, if a generator has set the automatic collection request point as when dumpster is 95% full, no action is taken unless the dumpster's fill-level is equal to or higher than that value. Once it is determined that the dumpster has reached that fill-level, a collection request is automatically delivered to mobile devices of all haulers, step 306a, 306b, 306c, and 306d, that can carry out the collection in terms of serviceable area, dumpster size, and waste type. No manual action is required from the generator for the collection request to be sent out. Once haulers receive the collection request on their mobile devices, they can choose whether to accept the collection request or not. In step 308a, 308b, 308c, and 308d, haulers send acceptance or rejection of the collection request from the haulers' mobile devices to computer system 110. If there are multiple haulers who accepted the request, a single hauler can be selected based on, but not limited to, service fee and time of acceptance. The haulers' method of accepting the collection request may take different forms. For example, in one embodiment, the hauler may simply press a button to accept or reject the request from the hauler's mobile device. In that scenario, the hauler who reacted the quickest to the request may win the right to carry out the collection. In another variation, the hauler may enter a price at which he/she is willing to carry out the job and the lowest bidder may win. If multiple haulers offer the same price, the hauler who offers that price earliest may win the job. Once a hauler is selected, in step 310, computer system 110 sends acknowledgement back to the hauler's mobile device to inform the hauler that he/she has been selected to carry out the collection. When informing the hauler, additional information about the collection request is provided, such as the location of the collection, time of the collection, and any special request the generator might have. At the same time, in step 312, computer system 110 sends confirmation to the generator's mobile device that his/her collection request has been accepted by the selected hauler. Along with the confirmation, the generator will receive information about the selected hauler, such as the hauler's company name, scheduled time window of the collection and the service fee he/she is expected to pay.

Figure 4A:
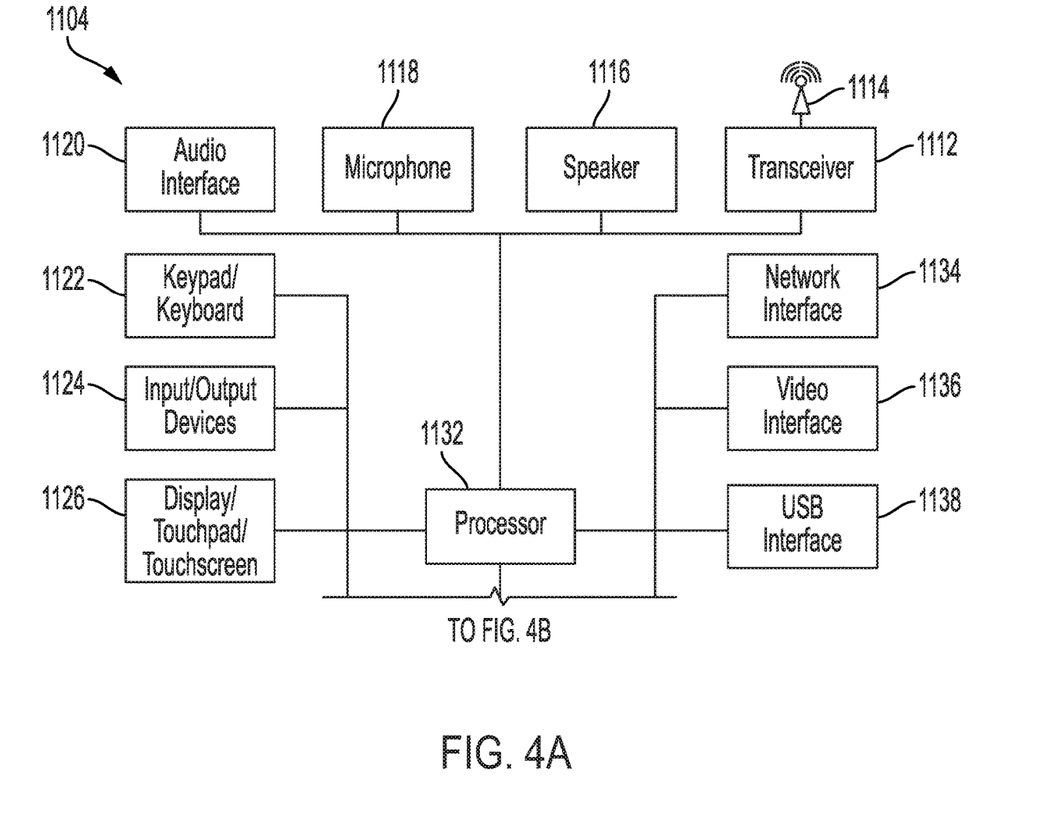
FIGS. 4A and 4B is an example of a schematic diagram of one embodiment of a computer/processing device wherein one or more of the techniques of the disclosure may be implemented.
Figure 4B:
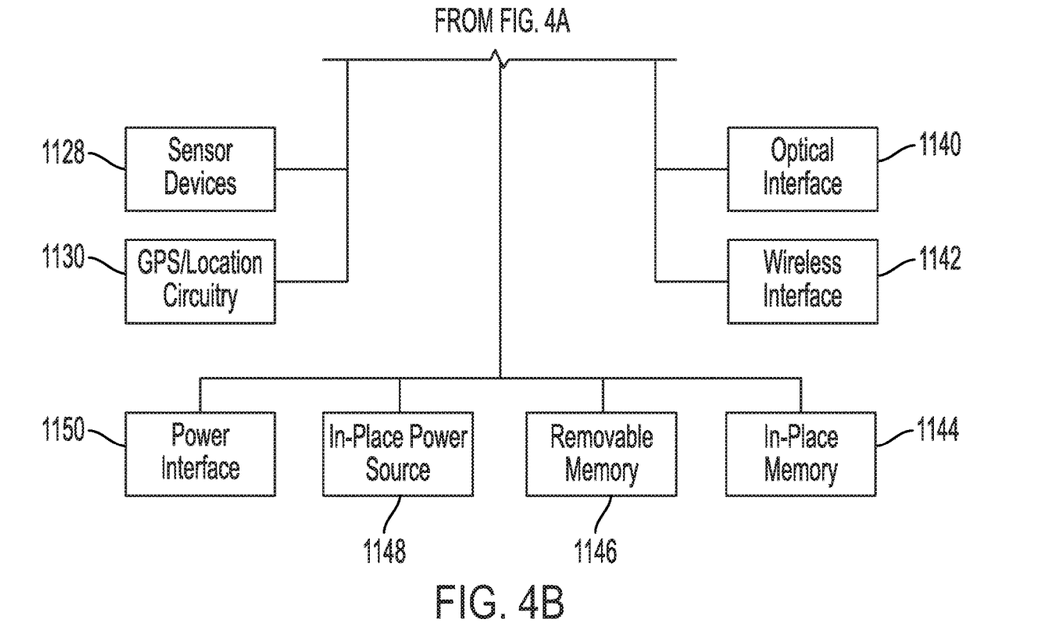

FIGS. 4A and 4B is a diagram of an example computer/computing (e.g., processing) device 1104 that may implement one or more techniques described herein, in whole or at least in part, with respect to one or more of the devices, methods, and/or systems described herein. In FIGS. 4A and 4B, the computing device 1104 may include one or more of: a processor 1132, a transceiver 1112, a transmit/receive element (e.g., antenna) 1114, a speaker 1116, a microphone 1118, an audio interface (e.g., earphone interface and/or audio cable receptacle) 1120, a keypad/keyboard 1122, one or more input/output devices 1124, a display/touchpad/touch screen 1126, one or more sensor devices 1128, Global Positioning System (GPS)/location circuitry 1130, a network interface 1134, a video interface 1136, a Universal Serial Bus (USB) Interface 1138, an optical interface 1140, a wireless interface 1142, in-place (e.g., non-removable) memory 1144, removable memory 1146, an in-place (e.g., removable or non-removable) power source 1148, and/or a power interface 1150 (e.g., power/data cable receptacle). The computing device 1104 may include one or more, or any sub-combination, of the aforementioned elements.

The computing device 1104 may take the form of a laptop computer, a desktop computer, a computer mainframe, a server, a terminal, a tablet, a smartphone, and/or a cloud-based computing device (e.g., at least partially), and/or the like.

The processor 1132 may be a general-purpose processor, a special-purpose processor, a conventional processor, a digital-signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type of integrated circuit (IC), and/or a finite-state machine, and/or the like. The processor 1132 may perform signal coding, data processing, power control, sensor control, interface control, video control, audio control, input/output processing, and/or any other functionality that enables the computing device 1104 to serve as and/or perform as (e.g., at least partially) one or more of the devices, methods, and/or systems disclosed herein.

The processor 1132 may be connected to the transceiver 1112, which may be connected to the transmit/receive element 1124. The processor 1132 and the transceiver 1112 may operate as connected separate components (as shown). The processor 1132 and the transceiver 1112 may be integrated together in an electronic package or chip (not shown).

The transmit/receive element 1114 may be configured to transmit signals to, and/or receive signals from, one or more wireless transmit/receive sources (not shown). For example, the transmit/receive element 1114 may be an antenna configured to transmit and/or receive RF signals. The transmit/receive element 1114 may be an emitter/detector configured to transmit and/or receive IR, UV, or visible light signals, for example. The transmit/receive element 1114 may be configured to transmit and/or receive RF and/or light signals. The transmit/receive element 1114 may be configured to transmit and/or receive any combination of wireless signals, including wireless communication signals according to any desired cellular mobile communications standard.

Although the transmit/receive element 1114 is shown as a single element, the computing device 1104 may include any number of transmit/receive elements 1114 (e.g., the same as for any of the elements 1112-1150). The computing device 1104 may employ Multiple-Input and Multiple-Output (MIMO) technology. For example, the computing device 1104 may include two or more transmit/receive elements 1114 for transmitting and/or receiving wireless signals.

The transceiver 1112 may be configured to modulate the signals that are to be transmitted by the transmit/receive element 1114 and/or to demodulate the signals that are received by the transmit/receive element 1114. The transceiver 1112 may include multiple transceivers for enabling the computing device 1104 to communicate via one or more, or multiple, radio access technologies, such as Universal Terrestrial Radio Access (UTRA), Evolved UTRA (E-UTRA), and/or IEEE 802.11, for example.

The processor 1132 may be connected to, may receive user input data from, and/or may send (e.g., as output) user data to: the speaker 1116, microphone 1118, the keypad/keyboard 1122, and/or the display/touchpad/touchscreen 1126 (e.g., a liquid crystal display (LCD) display unit or organic light-emitting diode (OLED) display unit, among others). The processor 1132 may retrieve information/data from and/or store information/data in, any type of suitable memory, such as the in-place memory 1144 and/or the removable memory 1146. The in-place memory 1144 may include random-access memory (RAM), read-only memory (ROM), a register, cache memory, semiconductor memory devices, and/or a hard disk, and/or any other type of memory storage device.

The removable memory 1146 may include a subscriber identity module (SIM) card, a portable hard drive, a memory stick, and/or a secure digital (SD) memory card, and/or the like. The processor 1132 may retrieve information/data from, and/or store information/data in, memory that might not be physically located on the computing device 1104, such as on a server, the cloud, and/or a home computer (not shown).

One or more of the elements 1112-1146 may receive power from the in-place power source 1148. In-place power source 1148 may be configured to distribute and/or control the power to one or more of the elements 1112-1146 of the computing device 1104. The in-place power source 1148 may be any suitable device for powering the computing device 1104. For example, the in-place power source 1148 may include one or more dry cell batteries (e.g., nickel-cadmium (NiCd), nickel-zinc (NiZn), nickel metal hydride (NiMH), lithium-ion (Li-ion), etc.), solar cells, and/or fuel cells, and/or the like.

Power interface 1150 may include a receptacle and/or a power adapter (e.g., transformer, regulator, and/or rectifier) that may receive externally sourced power via one or more AC and/or DC power cables, and/or via wireless power transmission. Any power received via power interface 1150 may energize one or more of the elements 1112-1146 of computing device 1104, perhaps for example exclusively or in parallel with in-place power source 1148. Any power received via power interface 1150 may be used to charge in-place power source 1148.

The processor 1132 may be connected to the GPS/location circuitry 1130, which may be configured to provide location information (e.g., longitude and/or latitude) regarding the current location of the computing device 1104. The computing device 1104 may acquire location information by way of any suitable location-determination technique.

The processor 1132 may be connected to the one or more input/output devices 1124, which may include one or more software and/or hardware modules that provide additional features, functionality and/or wired and/or wireless connectivity. For example, the one or more input/output devices 1124 may include a digital camera (e.g., for photographs and/or video), a hands free headset, a digital music player, a media player, a frequency modulated (FM) radio unit, an Internet browser, and/or a video game player module, and/or the like.

The processor 1132 may be connected to the one or more sensor devices 1128, which may include one or more software and/or hardware modules that provide additional features, functionality and/or wired and/or wireless connectivity. For example, the one or more sensor devices 1128 may include an accelerometer, an e-compass, and/or a vibration device, and/or the like.

The processor 1132 may be connected to the network interface 1134, which may include one or more software and/or hardware modules that provide additional features, functionality and/or wireless and/or wired connectivity. For example, the network interface 1134 may include a Network Interface Controller (NIC) module, a Local Area Network (LAN) module, an Ethernet module, a Physical Network Interface (PNI) module, and/or an IEEE 802 module, and/or the like.

The processor 1132 may be connected to the video interface 1136, which may include one or more software and/or hardware modules that provide additional features, functionality and/or wired and/or wireless connectivity. For example, the video interface 1136 may include a High-Definition Multimedia Interface (HDMI) module, a Digital Visual Interface (DVI) module, a Super Video Graphics Array (SVGA) module, and/or a Video Graphics Array (VGA) module, and/or the like.

The processor 1132 may be connected to the USB interface 1138, which may include one or more software and/or hardware modules that provide additional features, functionality and/or wired and/or wireless connectivity. For example, the USB interface 1138 may include a universal serial bus (USB) port, and/or the like.

The processor 1132 may be connected to the optical interface 1140, which may include one or more software and/or hardware modules that provide additional features, functionality and/or wired and/or wireless connectivity. For example, the optical interface 1140 may include a read/write Compact Disc module, a read/write Digital Versatile Disc (DVD) module, and/or a read/write Blu-ray™ disc module, and/or the like.

The processor 1132 may be connected to the wireless interface 1142, which may include one or more software and/or hardware modules that provide additional features, functionality and/or wireless connectivity. For example, the wireless interface 1142 may include a Bluetooth® module, an Ultra-Wideband (UWB) module, a ZigBee module, and/or a Wi-Fi (IEEE 802.11) module, and/or the like.

Figure 5:
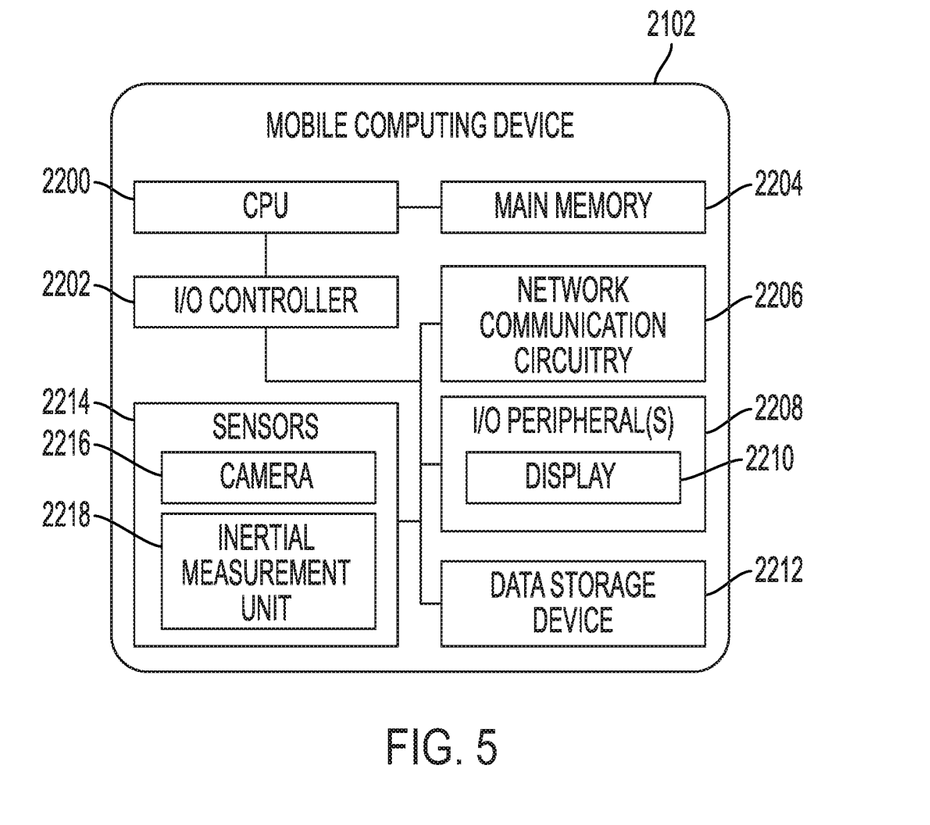
FIG. 5 is an example of a schematic diagram of one embodiment of a computer/processing device wherein one or more of the techniques of the disclosure may be implemented.

Referring now to FIG. 5 an illustrative mobile computing device is schematically illustrated. The illustrative mobile computing device may be used to implement any of the mobile devices and mobile communications described herein. The illustrative mobile computing device 2102 includes a central processing unit (CPU) 2200, an input/output (I/O) controller 2202, a memory 2204, network communication circuitry 2206, one or more I/O peripherals 2208, a data storage device 2212, a Global Positioning System (GPS)/location circuitry 2130 and/or various sensors 2214. In some scenarios, there may be additional, fewer, and/or alternative components to those of the illustrative mobile computing device 2102, such as a graphics processing unit (GPU). In some scenarios, one or more components may be combined on a single system-on-a-chip (SoC) on a single integrated circuit (IC). In some scenarios, the type of components of the respective mobile computing device 2102 may be predicated upon the type and/or intended use of the respective mobile computing device 2102.

The illustrative mobile computing device 2102 includes an application. The application of the mobile computing device 2102 is executed by mobile computing device 2102 to carry out the functions allocated to mobile computing device 2102 according to the present disclosure. The application may be embodied as any combination of hardware, firmware, software, and/or circuitry usable to perform the functions described herein.

The CPU 2200, or processor, may be embodied as any combination of hardware and/or circuitry capable of processing data. In some scenarios, the mobile computing device 2102 may include more than one CPU 2200. Perhaps depending on the scenario, the CPU 2200 may include one processing core (not shown), such as in a single-core processor architecture, or multiple processing cores, such as in a multi-core processor architecture. Irrespective of the number of processing cores and/or CPUs 2200, the CPU 2200 is capable of reading and/or executing program instructions. In some scenarios, the CPU 2200 may include cache memory (not shown) that may be integrated directly with the CPU 2200 or placed on a separate chip with a separate interconnect to the CPU 2200. In some scenarios, pipeline logic may be used to perform software and/or hardware operations (e.g., network traffic processing operations), rather than commands issued to/from the CPU 2200.

The I/O controller 2202, or I/O interface, may be embodied as any type of computer hardware and/or combination of circuitry capable of interfacing between input/output devices and/or the mobile computing device 2102. Illustratively, the I/O controller 2202 may be configured to receive input/output requests from the CPU 2200, and/or send control signals to the respective input/output devices, thereby managing the data flow to/from the mobile computing device 2102.

The memory 2204 may be embodied as any type of computer hardware and/or combination of circuitry capable of holding data and/or instructions for processing. Such memory 2204 may be referred to as main or primary memory. In some scenarios, one or more components of the mobile computing device 2102 may have direct access to memory, such that certain data may be stored via direct memory access (DMA) independently of the CPU 2200.

The network communication circuitry 2206 may be embodied as any type of computer hardware and/or combination of circuitry capable of managing network interfacing communications (e.g., messages, datagrams, packets, etc.) via wireless and/or wired communication modes. In some scenarios, the network communication circuitry 2206 may include a network interface controller (NIC) capable of being configured to connect the mobile computing device 2102 to a computer network, as well as other devices, perhaps for example depending on the scenario.

The one or more I/O peripherals 2208 may be embodied as any auxiliary device configured to connect to and/or communicate with the mobile computing device 2102. For example, the I/O peripherals 2208 may include, but are not limited to, a mouse, a keyboard, a monitor, a touchscreen, a printer, a scanner, a microphone, a speaker, etc. Some I/O devices may be capable of one function (e.g., input or output), or both functions (e.g., input and/or output. The illustrative I/O peripherals 2208 includes a display, which may be embodied as a touchscreen display capable of receiving user input via touch (e.g., one or more fingers, a stylus, etc.).

In some scenarios, the I/O peripherals 2208 may be connected to the mobile computing device 2102 via a cable (e.g., a ribbon cable, a wire, a universal serial bus (USB) cable, a high-definition multimedia interface (HDMI) cable, etc.) of the mobile computing device 2102. In some scenarios, the cable may be connected to a corresponding port (not shown) of the mobile computing device 2102 for which the communications made there between can be managed by the I/O controller 2202. In some scenarios, the I/O peripherals 2208 may be connected to the mobile computing device 2102 via a wireless mode of communication (e.g., Bluetooth®, Wi-Fi®, etc.) which can be managed by the network communication circuitry 2206.

The data storage device 2212 may be embodied as any type of computer hardware capable of the non-volatile storage of data (e.g., semiconductor storage media, magnetic storage media, optical storage media, etc.). Such data storage devices 2212 are commonly referred to as auxiliary and/or secondary storage, and/or may be used to store a large amount of data relative to the memory 2204 described above.

The illustrative sensors 2214 include a camera sensor 2216 and/or an inertial measurement unit (IMU) sensor 2218. In some scenarios, the sensors 2214 may include one or more additional sensors 2214. The camera sensor 2216 may be embodied as an type of image sensor (e.g., complementary metal-oxide-semiconductor (CMOS), charge-coupled device (CCD), hybrid CCD/CMOS, etc.) capable of capturing different types of scene data, such as color image data (RGB), color and depth image data (RGBD camera), depth sensor, stereo camera (L/R RGB), YUV, GRAY scale, and/or any other image sensor technology that can generate digital image frames.

The IMU sensor 2218 may include one or more software and/or hardware gyroscopes to measure the orientation of the mobile computing device 2102 (e.g., a 3-axis gyroscope), accelerometers to measure proper acceleration of the mobile computing device 2102 (e.g., a 3-axis accelerometer), magnetometers to measure the direction of the Earth's magnetic field relative to the mobile computing device 2102 (e.g., a 3-axis magnetometer), and/or any other type of inertial motion measurement software/hardware usable to perform the functions described herein (e.g., measure motion along three perpendicular linear axes and/or the rotation around, one or more, or each, of the three perpendicular linear axes).

The network 2206 may be implemented as any type of wired and/or wireless network, including a local area network (LAN), a wide area network (WAN), a global network (the Internet), etc. Accordingly, the network 2206 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, computer devices, storage devices, etc.

The CPU 2200 may be connected to the GPS/location circuitry 2213, which may be configured to provide location information (e.g., longitude and/or latitude) regarding the current location of the mobile computing device 2102. The mobile computing device 2102 may acquire location information by way of any suitable location-determination technique.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

I claim:

1. A method of requesting a waste collection service via a mobile communication network using a fill-level sensor operatively coupled to a waste receptacle, the method comprising:
   receiving, by a remote computer system, data generated by the fill-level sensor via the mobile communication network, the data comprising at least one of a sensed fill-level of the waste receptacle, an identity of the fill-level sensor, type of waste within the waste receptacle, weight of the waste within the waste receptacle, volume of the waste within the waste receptacle, location of the waste receptacle, size of the waste receptacle, and temperature data and battery usage data;
   comparing, by the remote computer system, the sensed fill-level of the waste receptacle to a predetermined fill-level;
   if the remote computer system determines that the sensed fill-level of the waste receptacle is equal to or greater than the predetermined fill-level, transmitting, by the remote computer system, a request for waste collection service to at least one waste collection service provider via a wireless communication device in the possession of the at least one waste collection service provider using the mobile communication network;
   receiving, by the remote computer system, from the wireless communication device and in response to input to the wireless communication device by one of the at least one waste collection service provider, a confirmation signal via the mobile communication network; and
   after receiving the confirmation signal at the remote computer system, transmitting, by the remote computer system via the mobile communication network, a first acknowledgement signal to the one of the at least one waste collection service provider confirming that the one of the at least one waste collection service provider is tasked with emptying the waste receptacle,
   wherein the remote computer system prioritizes transmitting the request for waste collection service based on the at least one of the type of waste within the waste receptacle, the weight of the waste within the waste receptacle, and the volume of the waste within the waste receptacle.

2. The method of claim 1, wherein the wireless communication device is located at a location of the at least one waste collection service provider.

3. The method of claim 1, wherein when the sensed fill-level of the waste receptacle is equal to or greater than the predetermined fill-level, the request for waste collection service is automatically transmitted to the at least one waste collection service provider.

4. The method of claim 1, further comprising the step of:
   after receiving the confirmation signal at the remote computer system, transmitting, by the remote computer system via the wireless communications network, a second acknowledgement signal to a waste site generator associated with the waste receptacle confirming that the one of the at least one waste collection service provider is tasked with emptying the waste receptacle.

5. The method of claim 4, wherein the second acknowledgement signal comprises information selected from the group consisting of:
   identification of the one of the at least one waste collection service provider,
   a scheduled time window for emptying the waste receptacle, and
   a service fee expected for emptying the waste receptacle.

6. The method of claim 1, wherein the fill-level sensor is selected from the group consisting of:
   an ultrasonic sensor,
   a laser sensor,
   a ToF (time of flight) sensor,
   a camera sensor,
   a weight sensor and
   an optical sensor.

7. The method of claim 1, wherein the at least one waste collection service provider to whom the remote computer system transmits the request for waste collection service is determined by the remote computer system by determining which of the waste collection service providers is capable of emptying the waste receptacle based on the information stored in the remote computer system.

8. The method of claim 7, wherein the information comprises at least one of:
   a waste collection service provider serviceable areas,
   a waste collection service provider serviceable waste receptacle size,
   a waste collection service provider serviceable waste receptacle type, and
   a waste collection service provider serviceable waste type.

9. The method of claim 1, wherein the wireless communication device comprises at least one of a cellular phone, a computer, and a tablet.

10. The method of claim 1, wherein if multiple ones of the at least one waste collection service provider transmit a confirmation signal to the remote computer system, then the remote computer system transmits the first acknowledgement signal to the one of the at least one waste collection service provider whose confirmation signal was received by the remote computer system first.

11. The method of claim 1, wherein if multiple ones of the at least one waste collection service provider transmit a confirmation signal to the remote computer system, then the remote computer system transmits the first acknowledgement signal to the one of the at least one waste collection service provider whose service fee stored by the remote computer system is the lowest.

12. The method of claim 1, wherein the type of waste within the waste receptacle comprises at least one of a perishable waste, an organic waste, a medical waste, and a recyclable waste.

13. The method of claim 1, wherein the fill-level sensor periodically transmits the data to the remote computer system and the remote computer system periodically determines whether the fill-level of the waste receptacle is equal to or greater than the predetermined fill-level.

14. The method of claim 1, wherein the remote computer system transmits additional information about the request for waste removal service further includes at least one of a location of the waste receptacle, a time window for emptying the waste receptacle, and a special request from a waste generator site associated with the waste receptacle.

15. A method of requesting a waste collection service via a mobile communication network using a fill-level sensor operatively coupled to a waste receptacle, the method comprising:
   transmitting data generated by the fill-level sensor to a remote computer system via the mobile communication network, the data comprising a sensed fill-level of the waste receptacle;
   comparing, by the remote computer system, the sensed fill-level in the data to a predetermined fill-level;

if the remote computer system determines that the sensed fill-level of the waste receptacle is equal to or greater than the predetermined fill-level, transmitting, by the remote computer system, a request for waste collection service to at least one waste collection service provider via a wireless communication device in the possession of the at least one waste collection service provider using the wireless communication network;

transmitting, from the wireless communication device and in response to input to the wireless communication device by one of the at least one waste collection service provider, a confirmation signal to the remote computer system via the wireless communication network;

after receiving the confirmation signal at the remote computer system, transmitting, by the remote computer system via the wireless communications network, a first acknowledgement signal to the one of the at least one waste collection service provider confirming that the one of the at least one waste collection service provider is tasked with emptying the waste receptacle, wherein the remote computer system prioritizes sending the request for waste collection service to empty the waste receptacle containing the perishable waste.

16. A non-transitory computer readable storage medium having computer readable program instructions thereon for causing a processor to request a waste collection service via a mobile communication network using a fill-level sensor operatively coupled to a waste receptacle, the program instructions, when executed by the processor, cause the processor to perform operations comprising:

receiving, by a remote computer system, data generated by the fill-level sensor via the mobile communication network, the data comprising at least one of a sensed fill-level of the waste receptacle, an identity of the fill-level sensor, type of waste within the waste receptacle, weight of the waste within the waste receptacle, volume of the waste within the waste receptacle, location of the waste receptacle, size of the waste receptacle, and temperature data and battery usage data;

comparing, by the remote computer system, the sensed fill-level of the waste receptacle to a predetermined fill-level;

if the remote computer system determines that the sensed fill-level of the waste receptacle is equal to or greater than the predetermined fill-level, transmitting, by the remote computer system, a request for waste collection service to at least one waste collection service provider via a wireless communication device in the possession of the at least one waste collection service provider using the mobile communication network;

receiving, by the remote computer system, from the wireless communication device and in response to input to the wireless communication device by one of the at least one waste collection service provider, a confirmation signal via the mobile communication network; and after receiving the confirmation signal at the remote computer system, transmitting, by the remote computer system via the mobile communication network, a first acknowledgement signal to the one of the at least one waste collection service provider confirming that the one of the at least one waste collection service provider is tasked with emptying the waste receptacle, wherein the remote computer system prioritizes transmitting the request for waste collection service based on the at least one of the type of waste within the waste receptacle, the weight of the waste within the waste receptacle, and the volume of the waste within the waste receptacle.

17. The non-transitory computer readable storage medium of claim 16, wherein when the sensed fill-level of the waste receptacle is equal to or greater than the predetermined fill-level, the request for waste collection service is automatically transmitted to the at least one waste collection service provider.

18. The non-transitory computer readable storage medium of claim 16, the operations further comprising:

after receiving the confirmation signal at the remote computer system, transmitting, by the remote computer system via the wireless communications network, a second acknowledgement signal to a waste site generator associated with the waste receptacle confirming that the one of the at least one waste collection service provider is tasked with emptying the waste receptacle.

19. The non-transitory computer readable storage medium of claim 16, wherein the fill-level sensor is selected from the group consisting of:
an ultrasonic sensor,
a laser sensor,
a ToF (time of flight) sensor,
a camera sensor,
a weight sensor and
an optical sensor.

* * * * *